US012736462B2

(12) United States Patent
Sasai et al.

(10) Patent No.: US 12,736,462 B2
(45) Date of Patent: Sep. 15, 2026

(54) MEASUREMENT INSTRUMENT, MEASUREMENT DEVICE, MEASUREMENT SYSTEM, AND MEASUREMENT METHOD

(71) Applicant: HORIBA Advanced Techno, Co., Ltd., Kyoto (JP)

(72) Inventors: Keisuke Sasai, Kyoto (JP); Issei Kobayashi, Kyoto (JP); Kazuhiro Irie, Kyoto (JP); Wataru Kinoshita, Kyoto (JP)

(73) Assignee: HORIBA Advanced Techno, Co., Ltd., Kyoto (JP)

( * ) Notice: Subject to any disclaimer, the term of this patent is extended or adjusted under 35 U.S.C. 154(b) by 128 days.

(21) Appl. No.: 18/767,893

(22) Filed: Jul. 9, 2024

(65) Prior Publication Data

US 2025/0020577 A1 Jan. 16, 2025

(30) Foreign Application Priority Data

Jul. 12, 2023 (JP) ................................ 2023-114311

(51) Int. Cl.
*G01N 21/05* (2006.01)
*G01N 21/15* (2006.01)
*G01N 21/53* (2006.01)

(52) U.S. Cl.
CPC ............. *G01N 21/05* (2013.01); *G01N 21/15* (2013.01); *G01N 21/532* (2013.01); *G01N 2021/152* (2013.01)

(58) Field of Classification Search
CPC ...... G01N 21/05; G01N 21/15; G01N 21/532; G01N 2021/152; G01N 21/51; G01N 15/075; G01N 21/01; G01N 21/251; G01N 21/59; G01N 21/27; G01N 2021/556
USPC .......................................................... 356/246
See application file for complete search history.

(56) References Cited

U.S. PATENT DOCUMENTS

2014/0204379 A1 7/2014 Suzuki et al.

FOREIGN PATENT DOCUMENTS

| | | | | |
|---|---|---|---|---|
| JP | 2010-60364 A | * | 3/2010 |
| JP | 2014157149 A | | 8/2014 |
| JP | 7221298 B2 | * | 2/2023 |
| JP | 7709460 B2 | * | 7/2025 |
| KR | 10-1768557 B1 | * | 8/2017 |

* cited by examiner

*Primary Examiner* — Md M Rahman
(74) *Attorney, Agent, or Firm* — Alleman Hall LLP

(57) ABSTRACT

A measurement instrument comprises a cylindrical cell that stores a measurement fluid, a drive mechanism that rotates the cell about a central axis, a first light source that is arranged outside the cell and irradiates the measurement fluid with first inspection light, a second light source that is arranged outside the cell and at a position different from the first light source in a rotation direction of the cell, and irradiates the measurement fluid with second inspection light, a detector that is arranged outside the cell and detects transmitted light of the first inspection light transmitted through the measurement fluid and scattered light of the second inspection light scattered by the measurement fluid, and a cleaning mechanism that is arranged inside the cell and comes into contact with and clean an inner peripheral surface of the cell.

20 Claims, 11 Drawing Sheets

101
X1
103
105
102
104
104
104
104
104

101
102
103
104
104
104
104
104
105
X1

102
104
104a
105a
105
102a
102b
102c

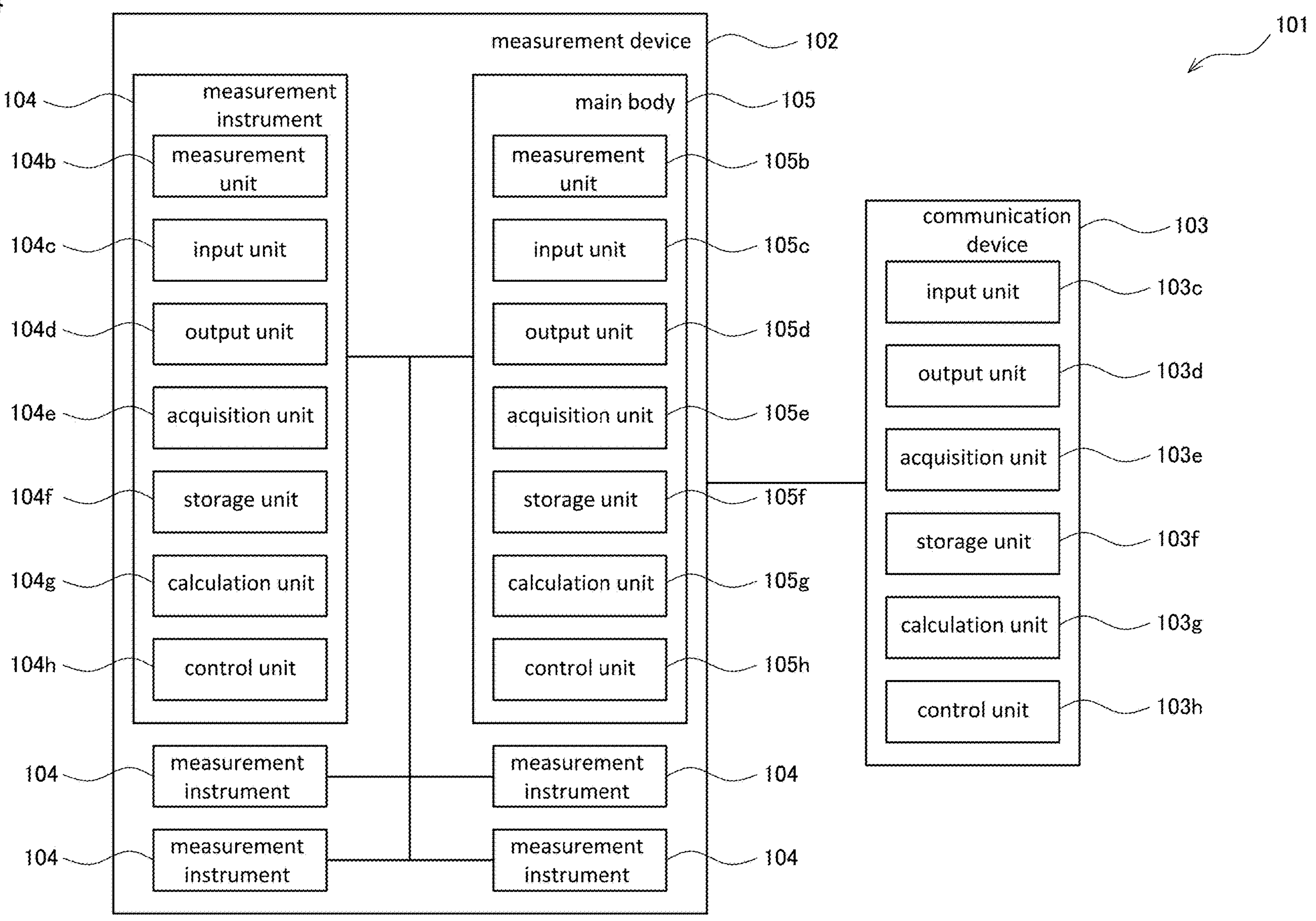
Fig. 4
measurement device
102
104
measurement instrument
104b
measurement unit
104c
input unit
104d
output unit
104e
acquisition unit
104f
storage unit
104g
calculation unit
104h
control unit
main body
105
measurement unit
105b
input unit
105c
output unit
105d
acquisition unit
105e
storage unit
105f
calculation unit
105g
control unit
105h
104
measurement instrument
measurement instrument
104
104
measurement instrument
measurement instrument
104
101
communication device
103
input unit
103c
output unit
103d
acquisition unit
103e
storage unit
103f
calculation unit
103g
control unit
103h 101
measurement device
102
measurement instrument
104
interface
104k
memory
104j
program
104m
processor
104i
measurement instrument
104
measurement instrument
104
measurement instrument
104
measurement instrument
104
main body
105
interface
105k
memory
105j
program
105m
processor
105i
communication device
103
interface
103k
memory
103j
program
103m
processor
103i

MEASUREMENT INSTRUMENT, MEASUREMENT DEVICE, MEASUREMENT SYSTEM, AND MEASUREMENT METHOD

CROSS REFERENCE TO RELATED APPLICATIONS

This application claims the benefit of priority of Japanese application no. 2023-114311, filed on Jul. 12, 2023, which is incorporated herein by reference.

BACKGROUND OF THE INVENTION

Field of the Invention

The present application relates to a measurement instrument, a measurement device, a measurement system, and a measurement method.

Description of the Related Art

In a measurement instrument that measures fluid using light, the fluid stored in the cell is irradiated with light from the outside of the cell, and transmitted light or scattered light generated from the fluid is detected. In doing so, inner walls of the cells need to be cleaned because they are contaminated by fluid-derived dirt. Conventionally, for example, as in JP-A-2014-157149, a cleaning body (a wiper, a brush, or the like) that moves along an inner wall is provided in a cell to clean the inner wall of the cell.

However, in the case of a measurement instrument that performs continuous measurement, a moving cleaning body blocks an optical path, and thus a time during which light cannot be detected occurs at the time of measurement. Furthermore, in a fluid with significant contamination, the cleaning frequency tends to be high. In continuous measurement, it is desired that there is no light blocking time.

Therefore, an object is to provide a measurement instrument, a measurement device, a measurement system, and a measurement method capable of continuously measuring fluid without light emitted from a light source being blocked by a cleaning body.

SUMMARY OF THE INVENTION

A measurement instrument includes:

a cylindrical cell that stores a measurement fluid;

a drive mechanism that rotates the cell about a central axis;

a first light source that is arranged outside the cell and irradiates the measurement fluid with first inspection light;

a second light source that is arranged outside the cell and at a position different from the first light source in a rotation direction of the cell, and irradiates the measurement fluid with second inspection light;

a detector that is arranged outside the cell and detects transmitted light of the first inspection light transmitted through the measurement fluid and scattered light of the second inspection light scattered by the measurement fluid; and a cleaning mechanism that is arranged inside the cell and comes into contact with and clean an inner peripheral surface of the cell.

A measurement device includes:

the measurement instrument; and a main body to which the measurement instrument is attached and detached.

A measurement system includes:

the measurement device; and a communication device capable of communicating with the measurement device.

A measurement method uses a measurement instrument, the measurement instrument including:

a cylindrical cell that stores a measurement fluid;

a drive mechanism that rotates the cell about a central axis;

a first light source that is arranged outside the cell and irradiates the measurement fluid with first inspection light;

a second light source that is arranged outside the cell and at a position different from the first light source in a rotation direction of the cell, and irradiates the measurement fluid with second inspection light;

a detector that is arranged outside the cell and detects transmitted light of the first inspection light transmitted through the measurement fluid and scattered light of the second inspection light scattered by the measurement fluid; and a cleaning mechanism that is arranged inside the cell and comes into contact with and clean an inner peripheral surface of the cell.

BRIEF DESCRIPTION OF THE DRAWINGS

FIG. 4 is a control block diagram of the measurement system according to the embodiment.

DETAILED DESCRIPTION OF THE INVENTION

Figure 1:
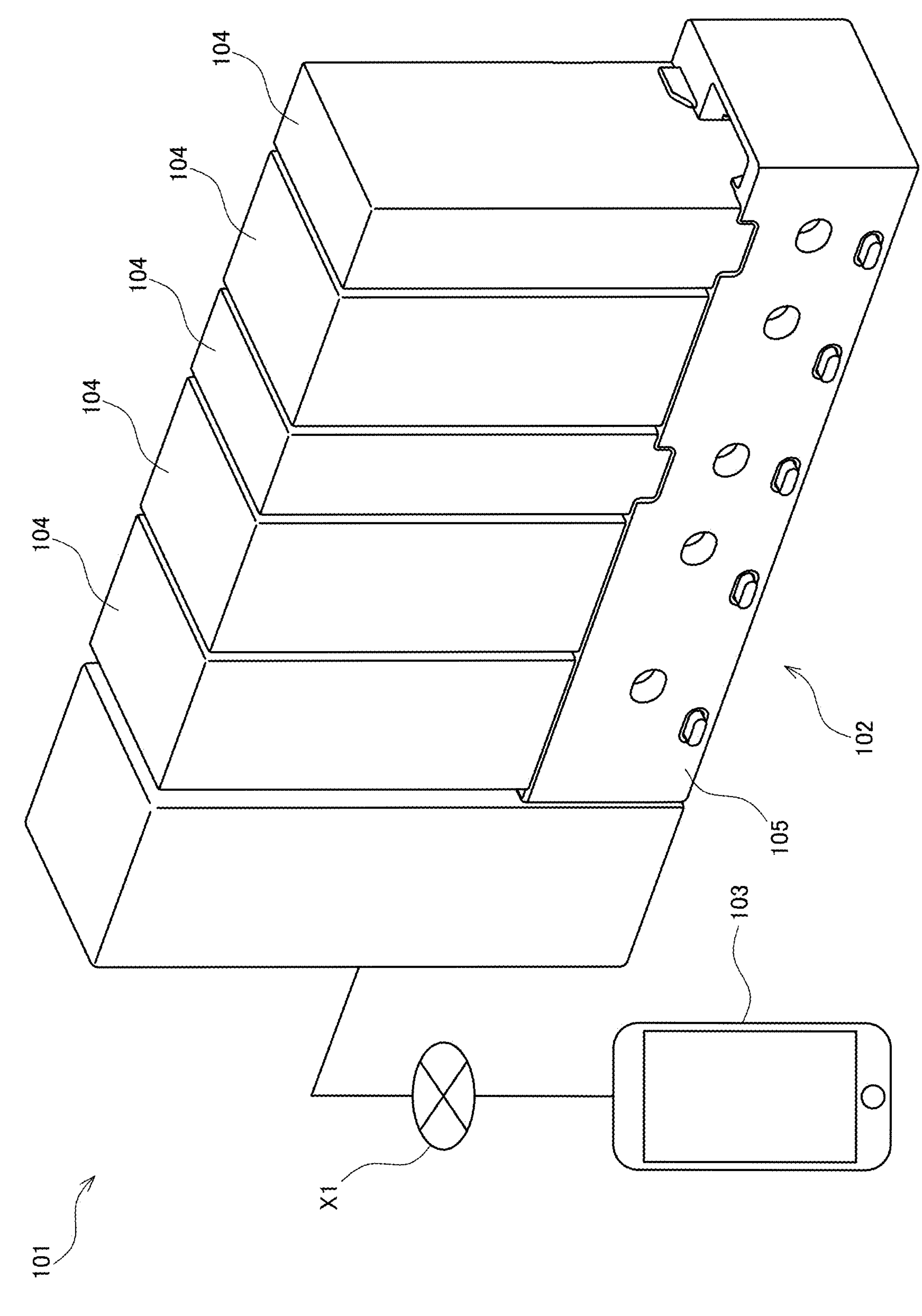
FIG. 1 is an overall schematic view of a measurement system according to an embodiment.

Hereinafter, an embodiment of a measurement system, a measurement device, and a measurement instrument will be described with reference to FIGS. 1 to 11. Note that, in the drawings, dimensional ratios in the drawings do not necessarily coincide with actual dimensional ratios, and the dimensional ratios in the drawings do not necessarily coincide with each other.

Figure 2:
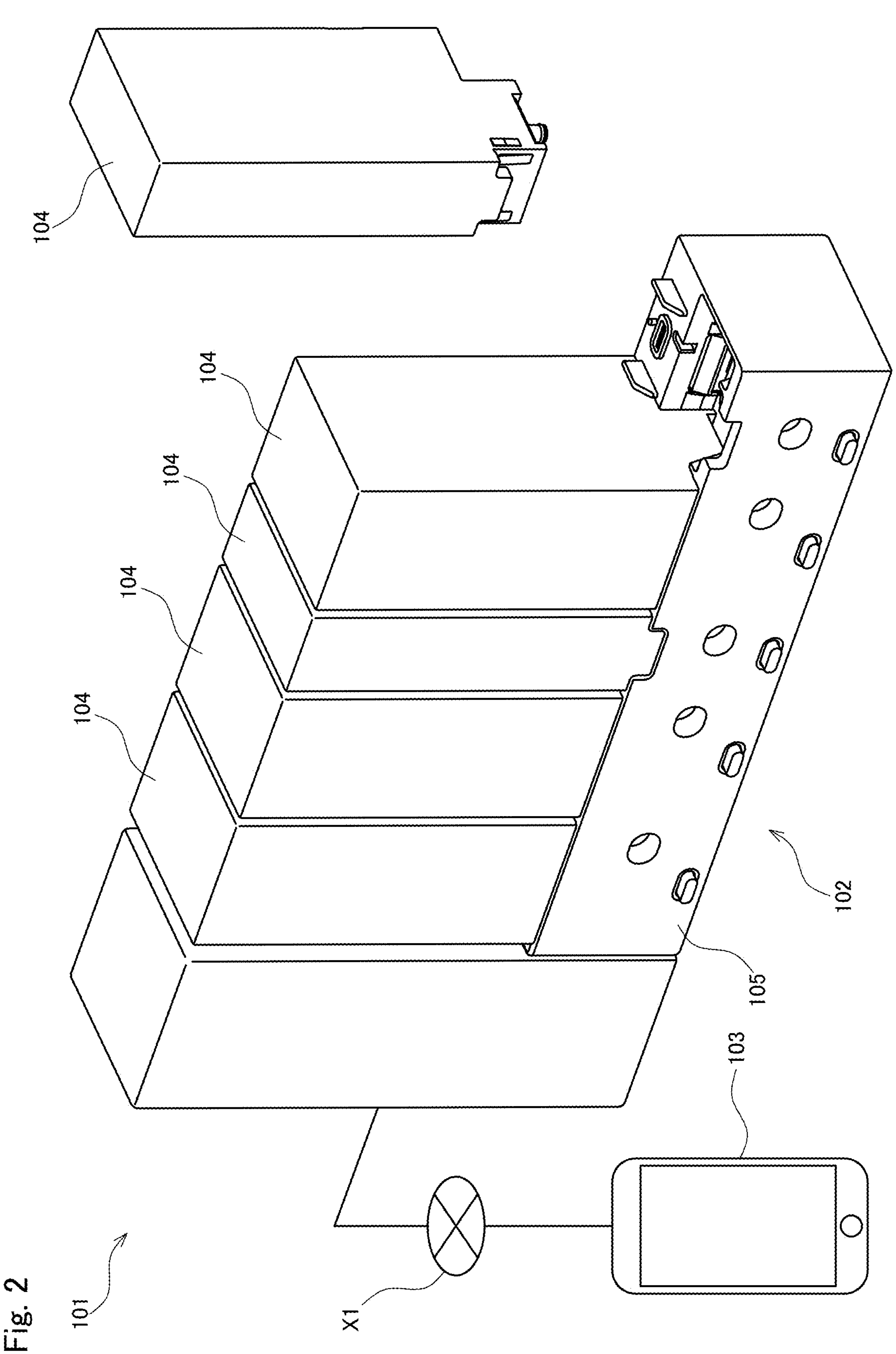
FIG. 2 is an overall schematic view of the measurement system according to the embodiment, illustrating a state in which one measurement instrument is detached from a main body.

As illustrated in FIGS. 1 and 2, a measurement system 101 may include, for example, a measurement device 102 that measures a fluid and a communication device 103 that can communicate with the measurement device 102 by a communication means X1. Note that the fluid is not particularly limited, and includes, for example, not only a liquid but also a gas, a mixture of a liquid and a gas, a mixture of a liquid and a solid, and the like.

Although not particularly limited, the communication device 103 may be, for example, a mobile terminal (for example, a smart device, a tablet computer, a notebook personal computer, or the like) as in the present embodiment. In addition, the communication means X1 may be, for example, a wireless communication means such as Wi-Fi or a wireless LAN, or may be, for example, a wired communication means such as a communication cable or a wired LAN.

The measurement device 102 may include, for example, a plurality of (five in the present embodiment) measurement instruments 104 for measuring a fluid, and a main body 105 to which each measurement instrument 104 is attached and detached. Note that the number of the measurement instruments 104 is not particularly limited, and may be, for example, one, two to four, or six or more.

The measurement instrument 104 is not particularly limited as long as it is an instrument that measures a value related to a fluid (for example, a characteristic value, a state value, and the like). For example, when the measurement instrument 104 is a water quality meter that measures a value related to water, the measurement instrument 104 may be, for example, a turbidity meter, a chromaticity meter, a pH meter, a residual chlorine concentration meter, a conductivity meter, a flow meter, a water temperature meter, or the like. Note that the plurality of measurement instruments 104 may measure different values related to the fluid.

Figure 3:
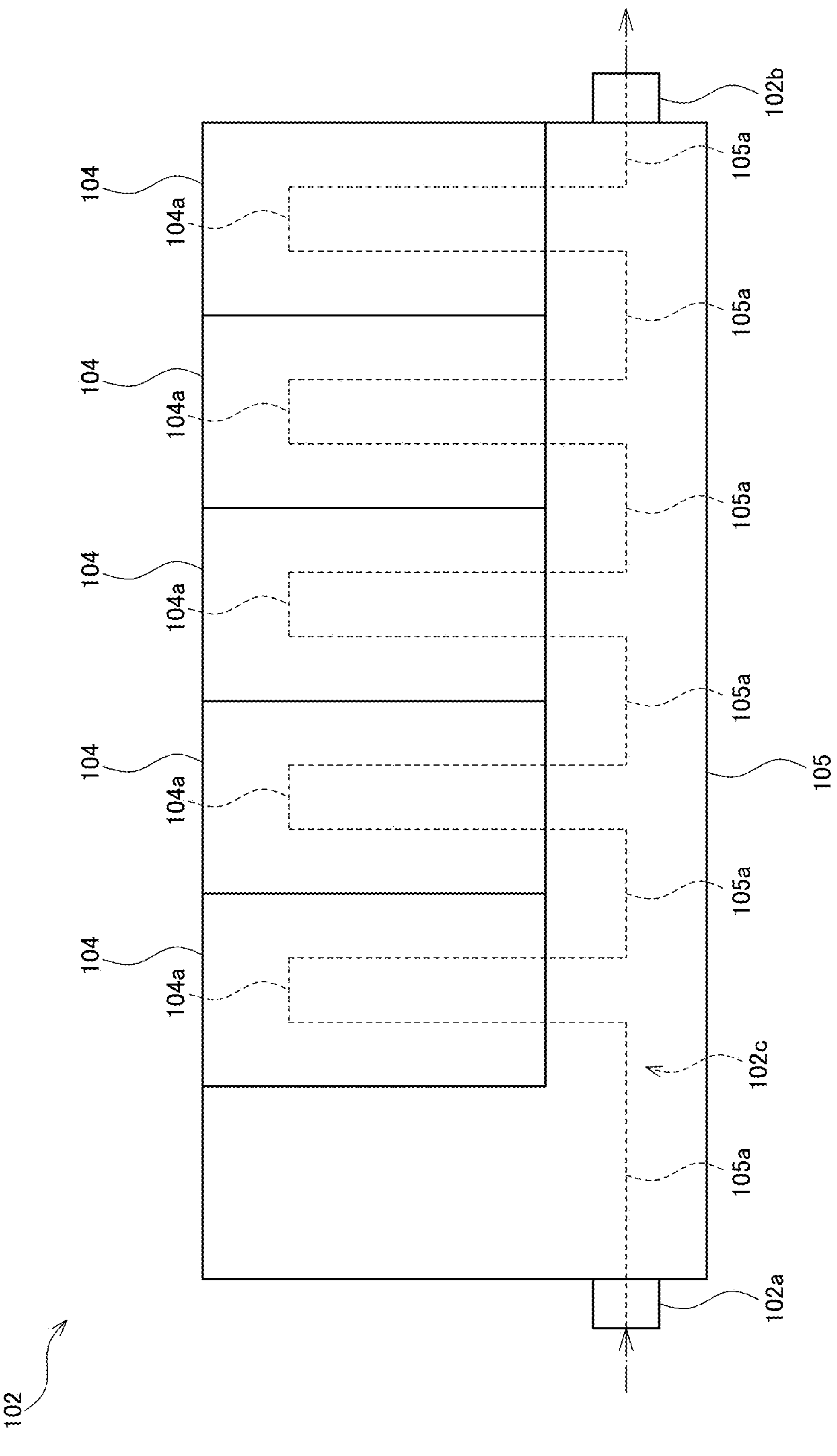
FIG. 3 is a diagram illustrating a fluid flow path of a measurement device according to the embodiment.

As illustrated in FIG. 3, for example, as in the present embodiment, the measurement device 102 may include an inflow portion 102*a* into which a fluid flows, an outflow portion 102*b* from which the fluid flows out, and a flow path 102*c* through which the fluid flows from the inflow portion 102*a* to the outflow portion 102*b*. Note that, although not illustrated, for example, the measurement device 102 may have a structure in which a fluid (for example, a chemical solution for cleaning, a calibration solution for calibration, and the like) different from the fluid to be measured (for example, water) flows through the flow path 102*c*.

In addition, for example, as in the present embodiment, the measurement instrument 104 may include a measurement flow path 104*a* through which the fluid flows, the main body 105 may include a main body flow path 105*a* through which the fluid flows, and the measurement flow path 104*a* and the main body flow path 105*a* may constitute the flow path 102*c*. The measurement flow path 104*a* and the main body flow path 105*a* may be connected to each other by attaching the measurement instrument 104 to the main body 105 to form the flow path 102*c*.

As illustrated in FIG. 4, the measurement instrument 104 and the main body 105 may include, for example, measurement units 104*b* and 105*b*, respectively, for measuring a fluid. Then, the measurement device 102 (specifically, each measurement instrument 104 and the main body 105) and the communication device 103 may include, for example, input units 103*c*, 104*c*, and 105*c* to which various data are input, and output units 103*d*, 104*d*, and 105*d* from which various data are output, as in the present embodiment.

In addition, for example, as in the present embodiment, the measurement device 102 (specifically, each measurement instrument 104 and the main body 105) and the communication device 103 may include acquisition units 103*e*, 104*e*, and 105*e* that acquire various data, storage units 103*f*, 104*f*, and 105*f* that store various data, calculation units 103*g*, 104*g*, and 105*g* that calculate various data, and control units 103*h*, 104*h*, and 105*h* that control the devices 102 (104,105) and 103 on the basis of various data.

Figure 5:
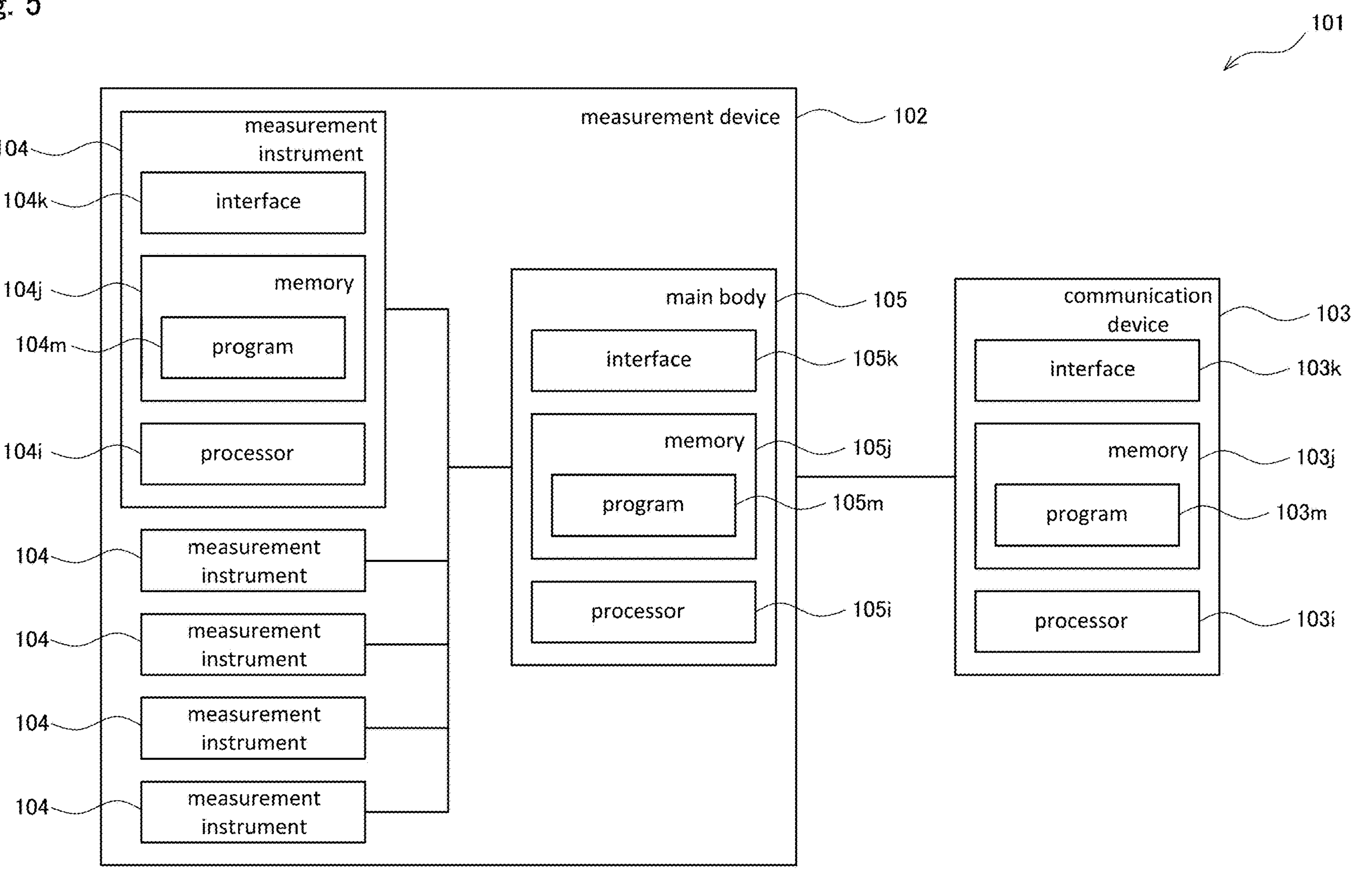
FIG. 5 is a control block diagram of the measurement system according to the embodiment.

Note that, as illustrated in FIG. 5, the measurement device 102 (specifically, each of the measurement instruments 104 and the main body 105) and the communication device 103 may include processors 103*i*, 104*i*, and 105*i* (for example, the calculation units 103*g*, 104*g*, and 105*g*, and the control units 103*h*, 104*h*, and 105*h*) such as a CPU and an MPU, memories 103*j*, 104*j*, and 105*j* (for example, the acquisition units 103*e*, 104*e*, and 105*e* and the storage units 103*f*, 104*f*, and 105*f*) such as a ROM and a RAM, various interfaces 104*k*, 105*k*, and 103*k* (for example, the acquisition units 103*e*, 104*e*, and 105*e*), and the like.

Then, programs 103*m*, 104*m*, and 105*m* stored in the memories 103*j*, 104*j*, and 105*j* may be executed by the processors 103*i*, 104*i*, and 105*i*, and software and hardware cooperate with each other to implement the calculation units 103*g*, 104*g*, and 105*g* and the control units 103*h*, 104*h*, and 105*h* of the measurement device 102 (specifically, each measurement instrument 104 and the main body 105) and the communication device 103.

Figure 6:
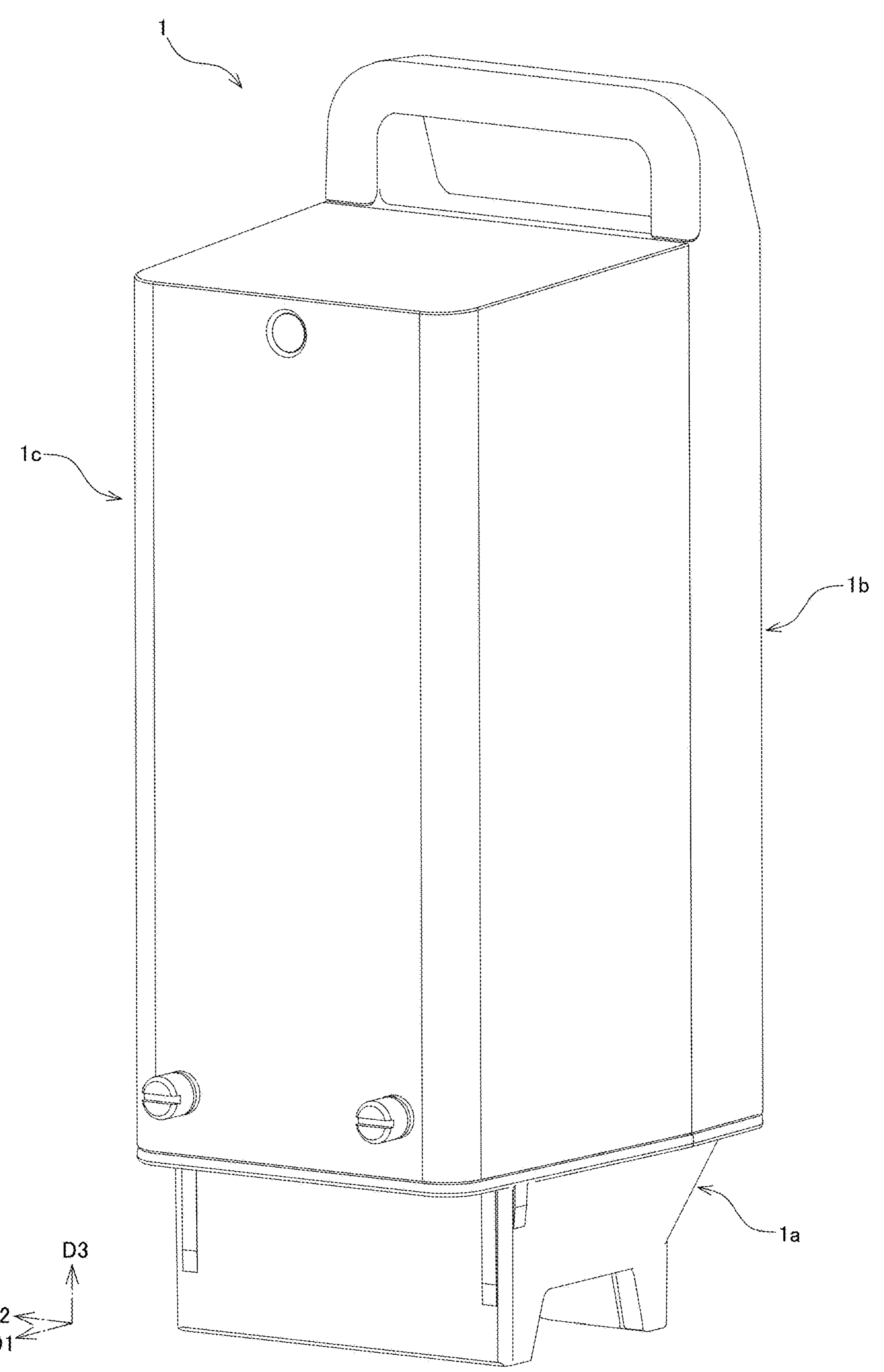
FIG. 6 is a perspective view of a measurement instrument according to the embodiment.

FIG. 6 is a perspective view of the measurement instrument 1 which is one of the plurality of measurement instruments 104 illustrated in FIGS. 1 and 2. As illustrated in FIG. 6, the measurement instrument 1 is formed in a substantially rectangular parallelepiped shape elongated in a vertical direction D3. The measurement instrument 1 includes a measurement unit 1*a*, and a case 1*b* and a cover 1*c* surrounding the measurement unit 1*a*. In the following description, a direction in which the case 1*b* and the cover 1*c* face each other is referred to as a first lateral direction D1, and a direction orthogonal to the first lateral direction D1 and the vertical direction D3 is referred to as a second lateral direction D2.

Figure 7:
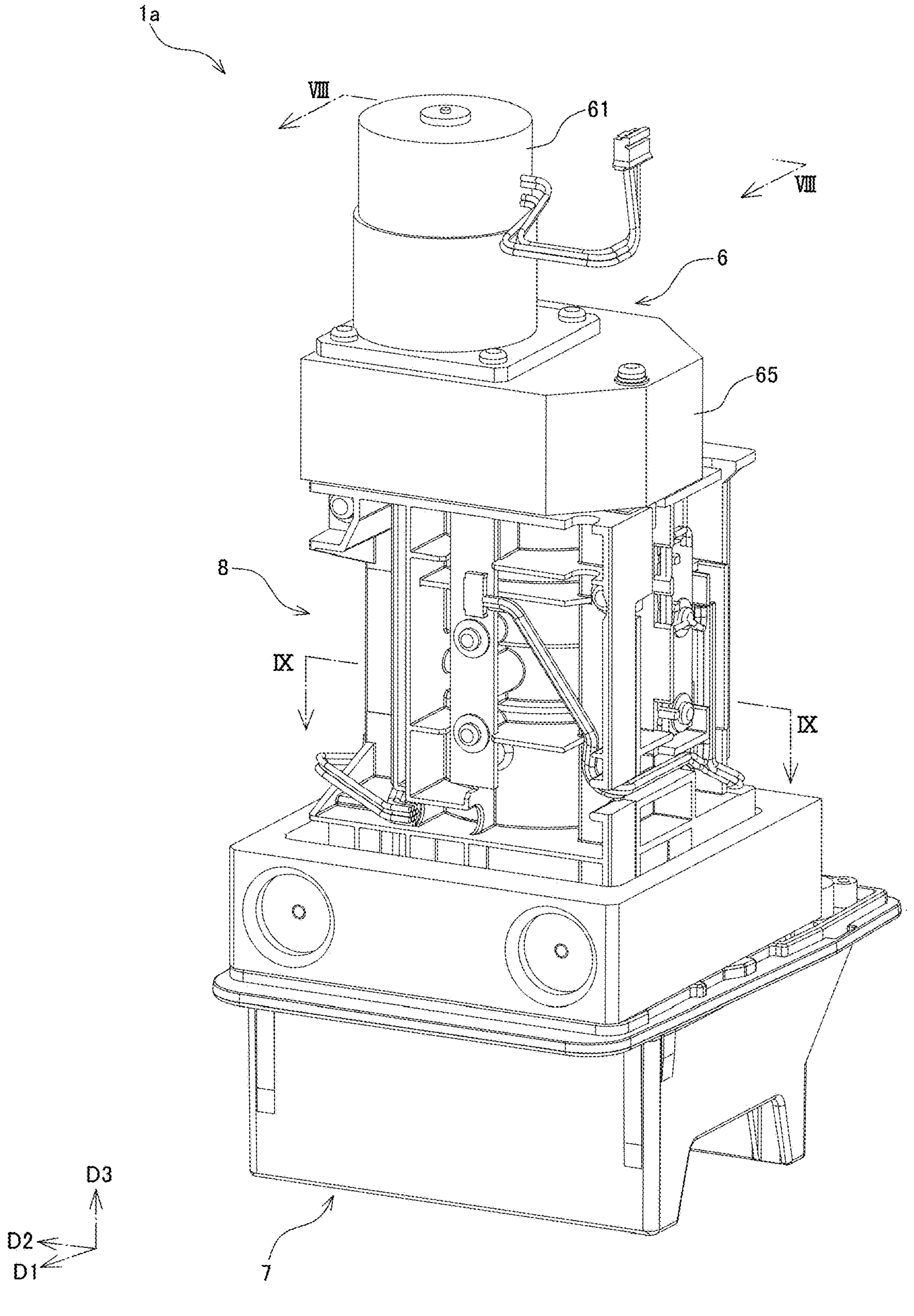
FIG. 7 is a perspective view of a measurement unit in a state where a case and a cover are removed.
Figure 8:
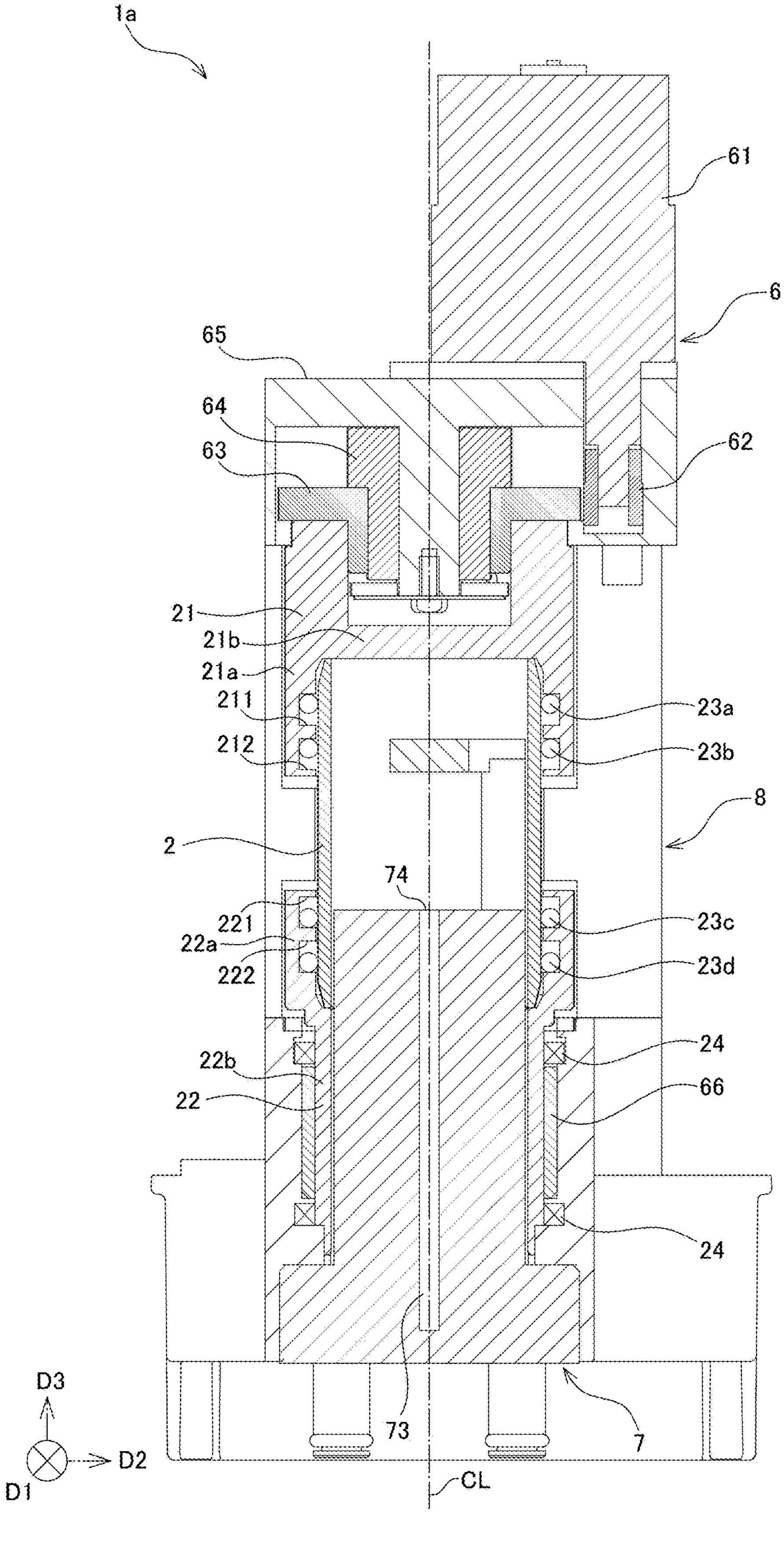
FIG. 8 is a cross-sectional view taken along line VIII-VIII in FIG. 7.
Figure 9:
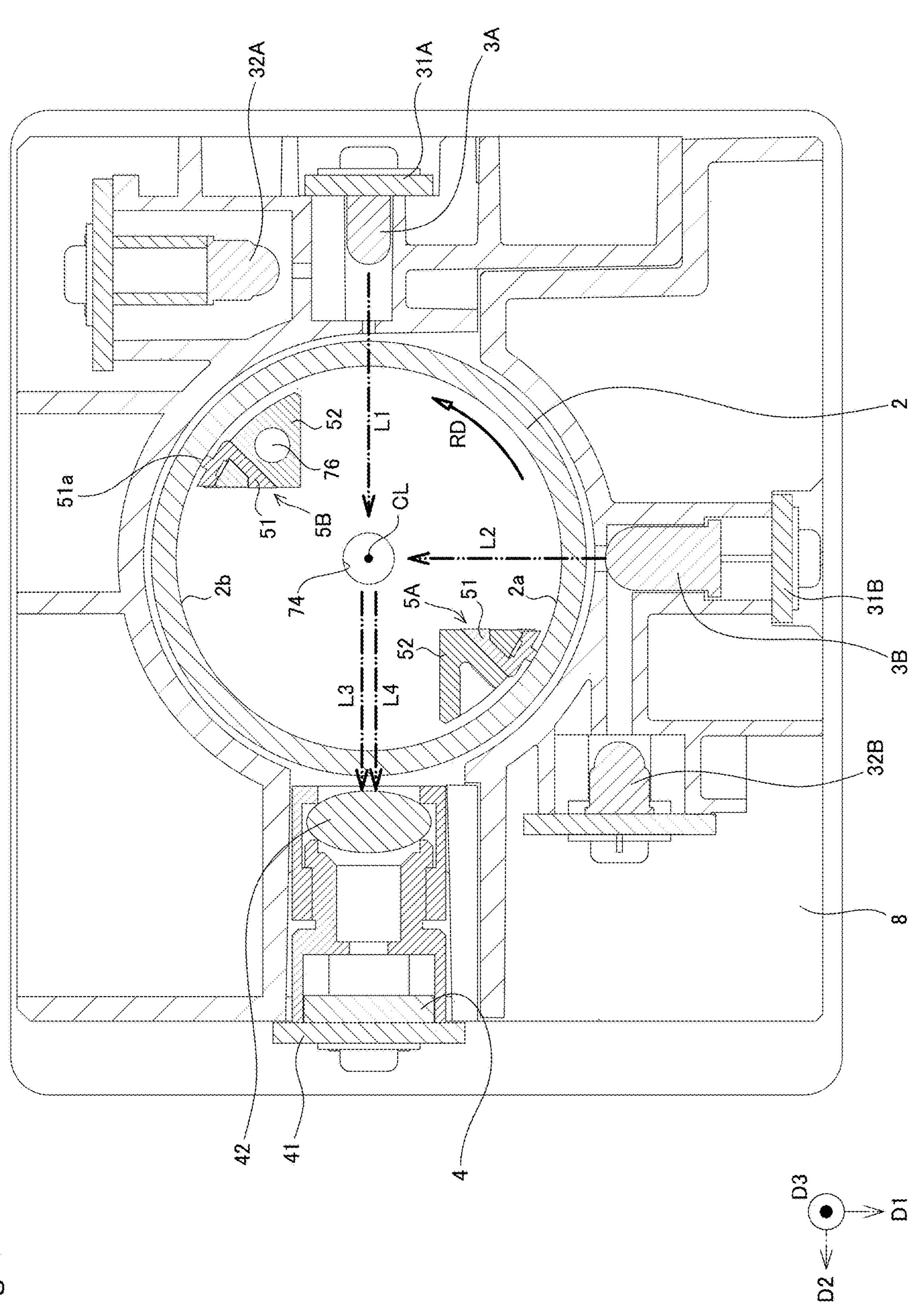
FIG. 9 is a cross-sectional view taken along line IX-IX of FIG. 7.

FIG. 7 is a perspective view illustrating the measurement unit 1*a* in a state where the case 1*b* and the cover 1*c* are removed. FIG. 8 is a cross-sectional view taken along line VIII-VIII of the measurement unit 1*a* illustrated in FIG. 7. FIG. 9 is a cross-sectional view taken along line IX-IX of the measurement unit 1*a* illustrated in FIG. 7.

The measurement unit 1*a* includes a cell 2, a first light source 3A, a second light source 3B, a detector 4, cleaning mechanisms 5A and 5B, and a drive mechanism 6. The measurement unit 1*a* further includes a base 7 connected to the main body 105 and a housing 8.

The cell 2 stores a fluid to be measured (hereinafter referred to as a measurement fluid). The cell 2 is constituted by a light transmissive material. Although not particularly limited, the light transmissive material is glass, an acrylic resin, a fluorine-based resin, a silicon resin, or the like, and is preferably a hard borosilicate glass having excellent translucency.

The cell 2 is formed in a cylindrical shape. A central axis CL of the cell 2 is arranged along a vertical direction D3, and the vertical direction D3 is an axial direction D3 of the cell 2. An outer diameter of the cell 2 is, for example, 34 to 36 mm. A thickness of the cylinder of the cell 2 is constant in the axial direction D3 except for both ends in the axial direction D3. The thickness of the cylinder of the cell 2 is preferably equal to or less than 3 mm, and more preferably equal to or less than 2 mm. The cell 2 is rotated about the central axis CL by the drive mechanism 6.

The first holder 21 and the second holder 22 are connected to both sides of the cell 2 in the axial direction D3. The first holder 21 and the second holder 22 are formed by resin.

Although not particularly limited, the resin constituting the first holder 21 is an ABS resin, and the resin constituting the second holder 22 is a POM resin.

The first holder 21 is formed in a cylindrical shape. The first holder 21 includes a cylindrical first connection portion 21*a* that covers an outer peripheral surface of the cell 2 and a closing portion 21*b* provided inside the first connection portion 21*a*. The closing portion 21*b* closes the upper end of the cell 2.

The first connection portion 21*a* includes two O-ring grooves 211 and 212 formed apart from each other in the vertical direction D3. The O-ring grooves 211 and 212 are formed in an inner peripheral surface of the first connection portion 21*a* over the entire circumferential direction. O-rings 23*a* and 23*b* are disposed in the O-ring grooves 211 and 212, respectively. The upper O-ring 23*a* ensures a sealing property between the cell 2 and the first holder 21, and prevents the measurement fluid from leaking to the outside of the cell 2. The lower O-ring 23*b* increases a frictional force between the cell 2 and the first holder 21, and enables the cell 2 to be rotated by the rotation of the first holder 21.

The second holder 22 is formed in a cylindrical shape. The second holder 22 includes a cylindrical second connection portion 22*a* covering the outer peripheral surface of the cell 2 and a cylindrical extension portion 22*b* extending downward from the second connection portion 22*a*.

The second connection portion 22*a* includes two O-ring grooves 221 and 222 formed apart from each other in the vertical direction D3. The O-ring grooves 221 and 222 are formed in an inner peripheral surface of the second connection portion 22*a* over the entire circumferential direction. O-rings 23*c* and 23*d* are disposed in the O-ring grooves 221 and 222, respectively. The upper O-ring 23*c* increases the frictional force between the cell 2 and the second holder 22, and enables the second holder 22 to be rotated by the rotation of the cell 2. The lower O-ring 23*d* ensures a sealing property between the cell 2 and the second holder 22, and prevents the measurement fluid from leaking to the outside of the cell 2.

An inner peripheral surface of the extension portion 22*b* is substantially flush with an inner peripheral surface of the cell 2. An outer peripheral surface of the extension portion 22*b* is sealed by two X-rings 24 arranged apart from each other in the vertical direction D3. The X-ring 24 has an X-shaped cross section, has low friction, and is suitable for sealing between the rotating extension portion 22*b* and the housing 8.

The first light source 3A and the second light source 3B are arranged outside the cell 2 as illustrated in FIG. 9. The first light source 3A and the second light source 3B are fixed to the housing 8. The first light source 3A irradiates the measurement fluid in the cell 2 with first inspection light L1. The second light source 3B irradiates the measurement fluid in the cell 2 with second inspection light L2. The first light source 3A is arranged so that an optical axis is along the second lateral direction D2. Further, the optical axis of the first light source 3A is orthogonal to the central axis CL of the cell 2. The second light source 3B is arranged so that an optical axis is along the first lateral direction D1. Further, the optical axis of the second light source 3B is orthogonal to the central axis CL of the cell 2. The second light source 3B is arranged at a position different from that of the first light source 3A in a rotation direction RD of the cell 2. Specifically, the first light source 3A and the second light source 3B are arranged at positions shifted by 90° in the rotation direction RD of the cell 2.

The first and second light sources 3A and 3B are, for example, light emitting diodes (LED) having a peak wavelength in a near-infrared region. The first and second light sources 3A and 3B are attached to the LED substrates 31A and 31B, respectively, and the LED substrates 31A and 31B are each attached to the housing 8. Note that, in the present embodiment, an optical lens is not arranged in front of the first and second light sources 3A and 3B in order to downsize the measurement instrument 1.

Reference light detection units 32A and 32B are arranged on sides of the first and second light sources 3A and 3B, respectively. The reference light detection units 32A and 32B detect the intensity of a part of light emitted from the first and second light sources 3A and 3B as reference light. The intensity of the reference light detected by the reference light detection units 32A and 32B is used to correct the intensity of transmitted light or scattered light obtained by the detector 4.

The detector 4 is arranged outside the cell 2 as illustrated in FIG. 9. The detector 4 is fixed to the housing 8. The detector 4 detects transmitted light or scattered light generated from the measurement fluid in the cell 2. The detector 4 is, for example, a photodiode whose peak sensitivity wavelength is near the peak wavelength of the LED.

The detector 4 is attached to a photodiode substrate 41, and the photodiode substrate 41 is attached to the housing 8. In addition, a lens 42 is arranged in front of the detector 4.

The detector 4 is arranged to face the first light source 3A across the central axis CL of the cell 2. Thus, the detector 4 can detect the transmitted light L3 of the first inspection light L1 transmitted through the measurement fluid. The transmitted light L3 detected by the detector 4 is used for measuring the chromaticity of the measurement fluid.

Further, the detector 4 is arranged at a position shifted from the second light source 3B by 90° in the rotation direction RD of the cell 2. Thus, the detector 4 can detect the scattered light L4 of the second inspection light L2 scattered by the measurement fluid. The scattered light L4 detected by the detector 4 is used to measure the turbidity of the measurement fluid. That is, two of the chromaticity and the turbidity can be measured using one detector 4, and thus the cost of the measurement instrument 1 can be reduced.

The cleaning mechanisms 5A and 5B are arranged inside the cell 2 as illustrated in FIG. 9. Further, the cleaning mechanisms 5A and 5B are arranged outside optical paths of the first inspection light L1, the second inspection light L2, the transmitted light L3, and the scattered light L4. The cleaning mechanisms 5A and 5B come into contact with an inner peripheral surface of the cell 2 to perform cleaning.

The cleaning mechanisms 5A and 5B include a first cleaning mechanism 5A and a second cleaning mechanism 5B. The first cleaning mechanism 5A is arranged between the second light source 3B and the detector 4 in the rotation direction RD of the cell 2. Thus, when the scattered light L4 of the second inspection light L2 is detected and the turbidity of the measurement fluid is measured, the first cleaning mechanism 5A can suppress stray light from being received by the detector 4, and as a result, the turbidity can be measured more accurately.

The second cleaning mechanism 5B is arranged on a side opposite to the first cleaning mechanism 5A across the optical axis of the first inspection light L1. In other words, the first cleaning mechanism 5A is arranged on one side in the first lateral direction D1 with respect to the optical axis of the first inspection light L1, and the second cleaning mechanism 5B is arranged on the other side in the first lateral direction D1 with respect to the optical axis of the first inspection light L1. Thus, when the chromaticity of the measurement fluid is measured by detecting the transmitted light L3 of the first inspection light L1, the first cleaning mechanism 5A can suppress light reflected by the inner peripheral surface **2*a* on one side in the first lateral direction D1 of the cell 2 from being received by the detector 4, and the second cleaning mechanism 5B can suppress light reflected by the inner peripheral surface 2*b* on the other side in the first lateral direction D1 of the cell 2 from being received by the detector 4**. As a result, the chromaticity can be measured more accurately.

The first cleaning mechanism 5A and the second cleaning mechanism 5B preferably face each other across the central axis CL of the cell 2. The first cleaning mechanism 5A and the second cleaning mechanism 5B press the cell 2 in directions opposite to each other about the central axis CL of the cell 2, and thus it is possible to suppress the cell 2 from moving and being shifted with respect to the optical axes of the first inspection light L1 and the second inspection light L2. Note that upper ends of the first cleaning mechanism 5A and the second cleaning mechanism 5B are connected to each other by a reinforcing member 53 (see FIG. 10). Thus, it is possible to suppress the first cleaning mechanism 5A and the second cleaning mechanism 5B from falling down toward the central axis CL of the cell 2. By fixing the first cleaning mechanism 5A and the second cleaning mechanism 5B by the reinforcing member 53, the cell 2 in contact with the first cleaning mechanism 5A and the second cleaning mechanism 5B can be positioned, and as a result, the measurement accuracy is stabilized.

The cleaning mechanisms 5A and 5B include a cleaning body in contact with the inner peripheral surface of the cell 2. The cleaning body is not particularly limited, and is, for example, a wiper 51 that wipes off dirt on the inner peripheral surface of the cell 2. Further, the cleaning mechanisms 5A and 5B each include a wiper fixing portion 52 for fixing the wiper 51.

The wiper 51 is formed by an elastic material such as rubber. The wiper 51 has a contact portion **51*a* in contact with the inner peripheral surface of the cell 2 over a predetermined range in the axial direction D3. The contact portion 51*a* of the wiper 51 is in pressure contact with the inner peripheral surface of the cell 2. The contact portion 51*a* is arranged at a position overlapping at least the first and second light sources 3A and 3B and the detector 4 when viewed in the rotation direction RD of the cell 2. Thus, the contact portion 51*a* of the wiper 51 can wipe the inner peripheral surface of the cell 2 located in front of the first and second light sources 3A and 3B and the detector 4 as the cell 2 rotates. At this time, the inner peripheral surface of the cell 2 is cleaned by rotating the cell 2 with respect to the cleaning mechanisms 5A and 5B fixed inside the cell 2, and thus the first inspection light L1, the second inspection light L2, the transmitted light L3, and the scattered light L4 are not blocked by the cleaning mechanisms 5A and 5B**, and the measurement fluid can be continuously measured.

The wiper fixing portion 52 extends upward from an upper end surface of the base 7. In the present embodiment, the wiper fixing portion 52 is formed integrally with the base 7. As illustrated in FIG. 9, a cross section of the wiper fixing portion 52 is formed in a fan shape. The central angle of the fan shape of the wiper fixing portion 52 is 90°. The wiper fixing portion 52 has a surface parallel to the first lateral direction D1 and the axial direction D3 and a surface parallel to the second lateral direction D2 and the axial direction D3. Thus, stray light with respect to the transmitted light L3 from the first light source 3A and the scattered light L4 from the second light source 3B can be effectively suppressed from being received by the detector 4.

An outer peripheral surface of the wiper fixing portion 52 having an arc-shaped cross section has a slight gap with the inner peripheral surface of the cell 2. The contact portion **51*a* of the wiper 51 protrudes outward from the outer peripheral surface of the wiper fixing portion 52. In addition, the contact portion 51*a* of the wiper 51 is formed so that a distal end is located radially outside the inner peripheral surface of the cell 2 in a state where the contact portion 51*a* is not arranged inside the cell 2 (state illustrated in FIG. 10), and is brought into pressure-contact with the cell 2 in a state where the contact portion 51*a* is arranged inside the cell 2 (state illustrated in FIG. 9**).

Figure 11:
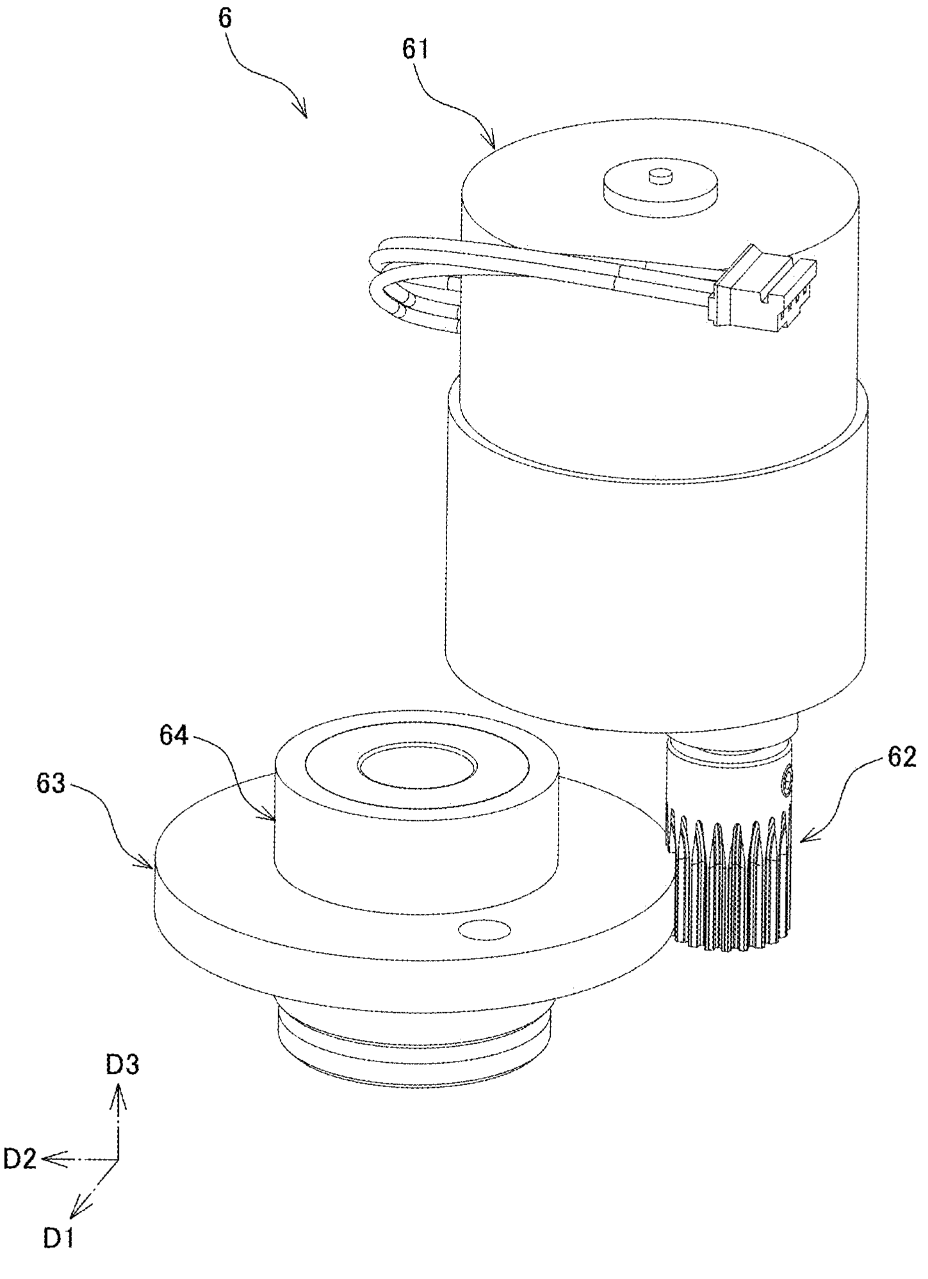
FIG. 11 is a perspective view of a drive mechanism of the measurement instrument.

As illustrated in FIGS. 8 and 11, the drive mechanism 6 includes a motor 61, a drive gear 62 rotationally driven by the motor 61, and a driven gear 63 that meshes with the drive gear 62 and rotates.

The motor 61 is fixed to an upper portion of the housing 8 via a gear base 65. The motor 61 is, for example, a stepping motor. The drive gear 62 is attached to a rotation shaft of the motor 61.

The driven gear 63 is rotatably supported by the gear base 65 (not illustrated in FIG. 11) via a bearing 64. An outer diameter of the driven gear 63 is substantially the same as an outer diameter of the first holder 21, and a plurality of teeth (not illustrated in FIG. 11) is formed on an outer peripheral surface of the driven gear 63. The driven gear 63 is coaxially fixed to the first holder 21, and rotates the first holder 21 about the central axis CL of the cell 2. Thus, the drive mechanism 6 can rotate the first holder 21 by rotating the drive gear 62 by the motor 61 and rotating the driven gear 63 by the drive gear 62. As a result, the drive mechanism 6 can rotate the cell 2 fixed to the first holder 21 about the central axis CL.

When the cell 2 rotates about the central axis CL, the inner peripheral surface of the cell 2 is cleaned by the wiper 51. The drive mechanism 6 can continuously or intermittently rotate the cell 2 according to the degree of contamination of the inner peripheral surface of the cell 2.

Note that, as illustrated in FIG. 8, the second holder 22 is rotatably supported by the housing 8 via the bearing 66. The bearing 66 is, for example, a low-friction resin cylindrical member. The bearing 66 is arranged between the two X-rings 24.

Figure 10:
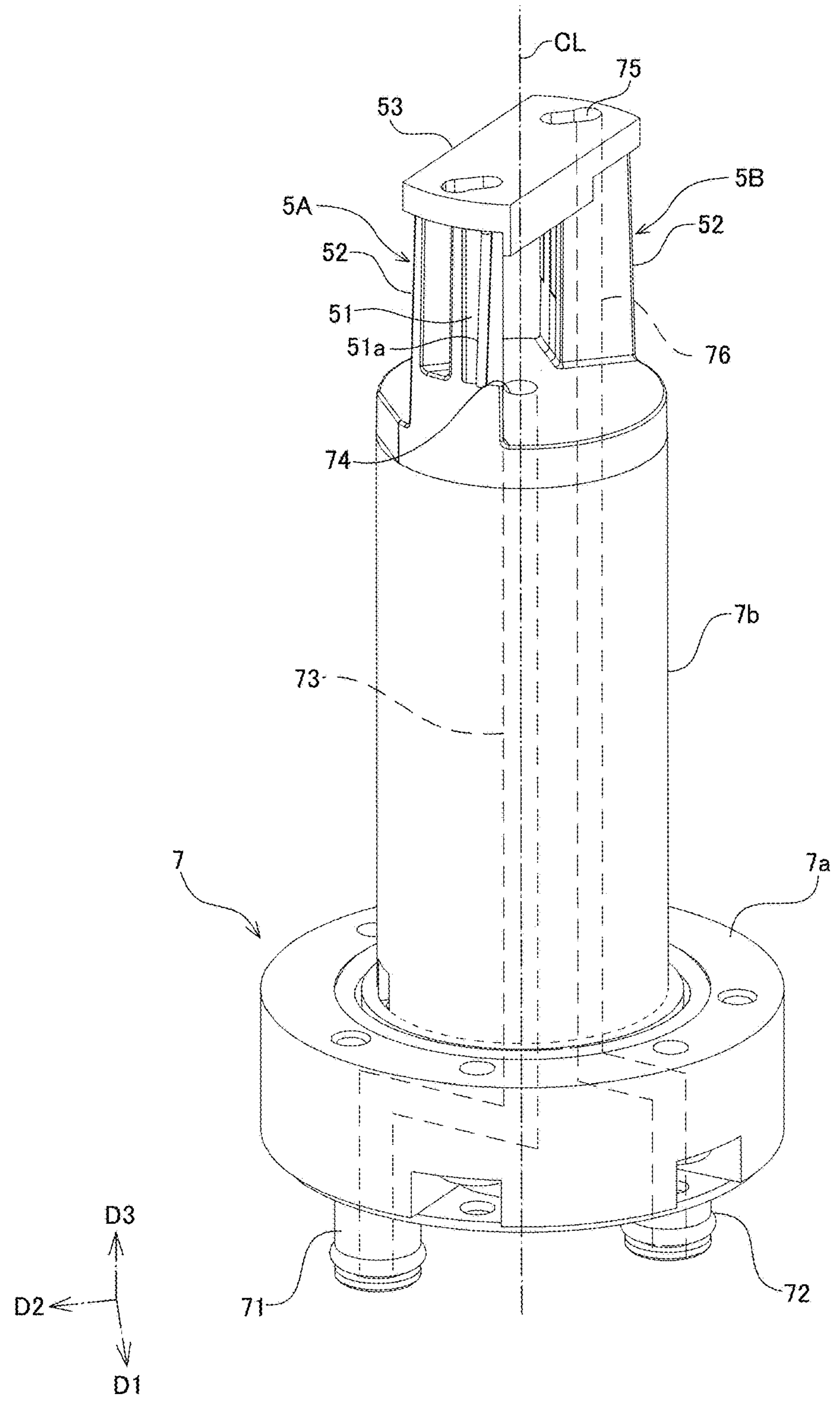
FIG. 10 is a perspective view of a base of the measurement instrument.

The base 7 includes an introduction pipe 71 and a discharge pipe 72 connected to the main body 105 on a bottom surface. The introduction pipe 71 and the discharge pipe 72 are arranged side by side in the second lateral direction D2. As illustrated in FIG. 10, the base 7 includes a rectangular portion **7*a* to which the housing 8 is attached and a columnar portion 7*b* extending in the axial direction D3 from the rectangular portion 7*a*. The columnar portion 7*b* is covered with the cell 2, the first holder 21, and the second holder 22 (see FIG. 8). An introduction flow path 73 extending in the axial direction D3 is formed at the center of the columnar portion 7*b*. The introduction flow path 73 communicates with the introduction pipe 71 via a flow path (indicated by broken lines in FIG. 10) formed inside the rectangular portion 7*a*. The introduction flow path 73 includes an introduction port 74 opened at an upper end surface of the columnar portion 7*b*. The introduction port 74 introduces the measurement fluid introduced from the introduction pipe 71 into the introduction flow path 73 into the cell 2**.

The measurement fluid introduced into the cell 2 is discharged from a discharge port 75. The discharge port 75 is formed on an upper end surface of the reinforcing member

53. The discharge port 75 is located above the optical paths of the first inspection light L1, the second inspection light L2, the transmitted light L3 and the scattered light L4. Thus, air accumulated in the upper portion of the cell 2 can be discharged from the discharge port 75, and thus it is possible to prevent the air from being positioned on the optical paths of the first inspection light L1, the second inspection light L2, the transmitted light L3 and the scattered light L4 and deteriorating the measurement accuracy.

Further, the discharge port 75 is positioned above the introduction port 74. That is, the introduction port 74 is arranged on one side (lower side) in the axial direction D3 with respect to the first inspection light L1, the second inspection light L2, the transmitted light L3 and the scattered light L4, and the discharge port 75 is arranged on the other side (upper side) in the axial direction D3 with respect to the first inspection light L1, the second inspection light L2, the transmitted light L3 and the scattered light L4. Thus, the measurement fluid introduced from the introduction port 74 continuously passes through the optical paths of the first inspection light L1, the second inspection light L2, the transmitted light L3 and the scattered light L4 in the process of being discharged from the discharge port 75, and thus the measurement fluid stored in the cell 2 can be continuously measured. Note that both the introduction port 74 and the discharge port 75 may be arranged on one side or the other side in the axial direction D3 with respect to the first inspection light L1, the second inspection light L2, the transmitted light L3 and the scattered light L4.

The reinforcing member 53 and the wiper fixing portion 52 include a discharge flow path 76 communicating with the discharge port 75. The discharge flow path 76 communicates with the discharge pipe 72 via a flow path (indicated by broken lines in FIG. 10) formed inside the columnar portion 7*b* and the rectangular portion 7*a*.

The housing 8 covers the cell 2, the first holder 21, the second holder 22, and the base 7. In the housing 8, at least a portion covering the outer peripheral surface of the cell 2 is preferably formed in black so as to absorb light. Further, the housing 8 supports the first and second light sources 3A, 3B and the detector 4 at predetermined positions.

The outer shape of the housing 8 has a rectangular shape in plan view (as viewed in the vertical direction D3). The cross section of the housing 8 has a short side along the first lateral direction D1 and a long side along the second lateral direction D2. The cell 2 is arranged near the center of the housing 8. The first light source 3A and the detector 4 are arranged on both sides in a long side direction with respect to the cell 2. The second light source 3B is arranged on one side in a short side direction with respect to the cell 2. The reference light detection units 32A and 32B are arranged at corner portions of the rectangle. By arranging the first and second light sources 3A and 3B, the reference light detection units 32A and 32B, and the detector 4 around the cell 2 in this manner, the housing 8 can be made compact.

As described above, the measurement system 101 according to the present embodiment includes the measurement device 102 and the communication device 103 capable of communicating with the measurement device 102.

Then, as in the present embodiment, the measurement device 102 includes the measurement instrument 104 and the main body 105 to which the measurement instrument 104 is attached and detached.

Further, as in the present embodiment, the measurement instrument 1 includes a cylindrical cell 2 that stores a measurement fluid, a drive mechanism 6 that rotates the cell 2 about a central axis CL, a first light source 3A that is arranged outside the cell 2 and irradiates the measurement fluid with first inspection light L1, a second light source 3B that is arranged outside the cell 2 and at a position different from the first light source 3A in a rotation direction RD of the cell 2, and irradiates the measurement fluid with second inspection light L2, a detector 4 that is arranged outside the cell 2 and detects transmitted light L3 of the first inspection light L1 transmitted through the measurement fluid and scattered light L4 of the second inspection light L2 scattered by the measurement fluid, and cleaning mechanisms 5A and 5B that are arranged inside the cell 2 and come into contact with and clean the inner peripheral surface of the cell 2.

With such a configuration, since the inner peripheral surface of the cell 2 is cleaned by rotating the cell 2 with respect to the cleaning mechanisms 5A and 5B fixed inside the cell 2, the light emitted from the first and second light sources 3A and 3B is not blocked by the cleaning mechanisms 5A and 5B, and the measurement can be continuously performed.

In addition, as in the present embodiment, a preferable configuration is that the optical axis of the first inspection light L1 is orthogonal to the central axis CL of the cell 2, and the cleaning mechanisms 5A and 5B include the first cleaning mechanism 5A arranged between the second light source 3B and the detector 4 in the rotation direction RD of the cell 2, and the second cleaning mechanism 5B arranged on the opposite side of the first cleaning mechanism 5A across the optical axis of the first inspection light L1.

With such a configuration, since the cleaning mechanisms 5A and 5B can suppress stray light from being received by the detector 4, it is possible to more accurately measure chromaticity and turbidity.

In addition, as in the present embodiment, a preferable configuration is that the first cleaning mechanism 5A and the second cleaning mechanism 5B face each other across the central axis CL of the cell 2.

With such a configuration, it is possible to suppress the cell 2 from moving and being shifted with respect to the optical axes of the first inspection light L1 and the second inspection light L2 due to movement of the cell 2 by the first and second cleaning mechanisms 5A and 5B.

In addition, as in the present embodiment, a preferable configuration is that the cleaning mechanisms 5A and 5B include the reinforcing member 53 that connects the first cleaning mechanism 5A and the second cleaning mechanism 5B.

With such a configuration, by fixing the first cleaning mechanism 5A and the second cleaning mechanism 5B by the reinforcing member 53, the cell 2 in contact with the first cleaning mechanism 5A and the second cleaning mechanism 5B can be positioned, and as a result, the measurement accuracy is stabilized.

In addition, as in the present embodiment, a preferable configuration is that the cleaning mechanisms 5A and 5B include a cleaning body (the wiper 51 in the present embodiment) in contact with the inner peripheral surface of the cell 2.

With such a configuration, dirt on the inner peripheral surface of the cell 2 can be appropriately removed by the cleaning body.

In addition, as in the present embodiment, a preferable configuration is that, when the detector 4 detects the scattered light L4 of the second inspection light L2 to measure the turbidity of the measurement fluid, the first cleaning mechanism 5A suppresses stray light from being received by the detector 4.

With such a configuration, it is possible to measure turbidity more accurately.

In addition, as in the present embodiment, a preferable configuration is that, when the detector 4 detects the transmitted light L3 of the first inspection light L1 and measures the chromaticity of the measurement fluid, the first cleaning mechanism 5A suppresses reflected light of the first inspection light L1 reflected by the inner peripheral surface 2*a* of the cell 2 on the side where the first cleaning mechanism 5A is arranged with respect to the optical axis of the first inspection light L1 in the inner peripheral surface from being received by the detector 4, and the second cleaning mechanism 5B suppresses reflected light of the first inspection light L1 reflected by the inner peripheral surface 2*b* of the cell 2 on the side where the second cleaning mechanism 5B is arranged with respect to the optical axis of the first inspection light L1 in the inner peripheral surface of the cell 2 from being received by the detector 4.

With such a configuration, chromaticity can be measured more accurately.

Note that the measurement system 101, the measurement device 102, and the measurement instrument 1 are not limited to the configurations of the above-described embodiments, and are not limited to the above-described operations and effects. In addition, it is a matter of course that various modifications can be made to the measurement system 101, the measurement device 102, and the measurement instrument 1 without departing from the gist of the present invention. For example, it is a matter of course that one or a plurality of configurations, methods, and the like according to the following various modification examples may be arbitrarily selected and employed in the configurations, methods, and the like according to the above-described embodiments.

(1) The measurement instrument 1 according to the above embodiment has a configuration in which the cleaning mechanisms 5A and 5B include the first cleaning mechanism 5A arranged between the second light source 3B and the detector 4 in the rotation direction RD of the cell 2, and the second cleaning mechanism 5B arranged on the opposite side of the first cleaning mechanism 5A across the optical axis of the first inspection light L1. However, the measurement instrument 1 is not limited to such a configuration. The measurement instrument 1 may be configured to include only one of the first cleaning mechanism 5A and the second cleaning mechanism 5B.

(2) The measurement instrument 1 according to the above embodiment has a configuration in which the first cleaning mechanism 5A and the second cleaning mechanism 5B face each other across the central axis CL of the cell 2. However, the measurement instrument 1 is not limited to such a configuration. For example, a configuration may be employed in which the cleaning mechanisms 5A and 5B include the first cleaning mechanism 5A arranged between the second light source 3B and the detector 4 in the rotation direction RD of the cell 2, and the second cleaning mechanism 5B arranged on the opposite side of the first cleaning mechanism 5A across the optical axis of the first inspection light L1, and the first cleaning mechanism 5A and the second cleaning mechanism 5B are arranged at positions symmetric with respect to a plane including the optical axis of the first inspection light L1 and the central axis CL of the cell 2.

(3) In the measurement instrument 1 according to the above embodiment, the cleaning mechanisms 5A and 5B are configured to include the wiper 51 in contact with the inner peripheral surface of the cell 2. However, the measurement instrument 1 is not limited to such a configuration. The cleaning mechanisms 5A and 5B may include, for example, a brush, a mesh, or the like as the cleaning body.

The invention claimed is:

1. A measurement instrument comprising:

a cylindrical cell that stores a measurement fluid;

a drive mechanism that rotates the cell about a central axis;

a first light source that is arranged outside the cell and irradiates the measurement fluid with first inspection light;

a second light source that is arranged outside the cell and at a position different from the first light source in a rotation direction of the cell, and irradiates the measurement fluid with second inspection light;

a detector that is arranged outside the cell and detects transmitted light of the first inspection light transmitted through the measurement fluid and scattered light of the second inspection light scattered by the measurement fluid; and a cleaning mechanism that is arranged inside the cell and comes into contact with and clean an inner peripheral surface of the cell, wherein the cleaning mechanism includes a first cleaning mechanism arranged between the second light source and the detector.

2. The measurement instrument according to claim 1, wherein an optical axis of the first inspection light is orthogonal to the central axis of the cell, and the first cleaning mechanism is arranged between the second light source and the detector in the rotation direction of the cell, and a second cleaning mechanism is arranged on an opposite side of the first cleaning mechanism across the optical axis of the first inspection light.

3. The measurement instrument according to claim 2, wherein the first cleaning mechanism and the second cleaning mechanism face each other across the central axis of the cell.

4. The measurement instrument according to claim 3, wherein the cleaning mechanism includes a reinforcing member that connects the first cleaning mechanism and the second cleaning mechanism.

5. The measurement instrument according to claim 2, wherein when the detector detects scattered light of the second inspection light to measure turbidity of a measurement fluid, the first cleaning mechanism suppresses stray light from being received by the detector.

6. The measurement instrument according to claim 2, wherein when the detector detects transmitted light of the first inspection light and measures chromaticity of a measurement fluid, the first cleaning mechanism suppresses reflected light of the first inspection light reflected by an inner peripheral surface of the cell on a side where the first cleaning mechanism is arranged with respect to an optical axis of the first inspection light in the inner peripheral surface from being received by the detector, and the second cleaning mechanism suppresses reflected light of the first inspection light reflected by an inner peripheral surface of the cell on a side where the second cleaning mechanism is arranged with respect to the optical axis of the first inspection light in the inner peripheral surface from being received by the detector.

7. The measurement instrument according to claim 1, wherein the cleaning mechanism includes a cleaning body in contact with the inner peripheral surface of the cell.

8. The measurement instrument according to claim 1, wherein the first light source and the second light source are arranged at positions shifted by 90° in the rotation direction of the cell.

9. The measurement instrument according to claim 1, wherein the detector is arranged to face the first light source across the central axis of the cell, and the detector is arranged at a position shifted from the second light source by 90° in the rotation direction of the cell.

10. The measurement instrument according to claim 1, wherein the cleaning mechanism is arranged outside optical paths of the first inspection light, the second inspection light, the transmitted light, and the scattered light.

11. The measurement instrument according to claim 1, wherein the cleaning mechanism includes a wiper that wipes dirt on the inner peripheral surface of the cell and a wiper fixing portion that fixes the wiper, and the wiper fixing portion extends in the axial direction of the cell.

12. The measurement instrument according to claim 11, wherein the wiper has a contact portion in contact with the inner peripheral surface of the cell over a predetermined range in the axial direction of the cell, and the contact portion is arranged at a position overlapping at least the first light source, the second light source and the detector when viewed in a rotation direction of the cell.

13. The measurement instrument according to claim 11, wherein an outer peripheral surface of the wiper fixing portion having an arc-shaped cross section has a slight gap with the inner peripheral surface of the cell, and the contact portion protrudes outward from the outer peripheral surface of the wiper fixing portion.

14. The measurement instrument according to claim 11, wherein the wiper fixing portion has a surface parallel to the optical axis of the first inspection light and the central axis of the cell and a surface parallel to the optical axis of the second inspection light and the central axis of the cell.

15. The measurement instrument according to claim 1, further comprising an introduction port through which a measurement fluid is introduced into the cell, and a discharge port through which the measurement fluid is discharged from the cell.

16. The measurement instrument according to claim 15, wherein the discharge port is located above the introduction port.

17. The measurement instrument according to claim 15, wherein the introduction port is arranged on lower side with respect to the optical paths of the first inspection light, the second inspection light, the transmitted light and the scattered light, and the discharge port is arranged on upper side with respect to the optical paths of the first inspection light, the second inspection light, the transmitted light and the scattered light.

18. A measurement device comprising:

the measurement instrument according to claim 1; and a main body to which the measurement instrument is attached and detached.

19. A measurement system comprising:

the measurement device according to claim 18; and a communication device communicatively coupled with the measurement device.

20. A measurement method using a measurement instrument, the measurement instrument including:

a cylindrical cell that stores a measurement fluid;

a drive mechanism that rotates the cell about a central axis;

a first light source that is arranged outside the cell and irradiates the measurement fluid with first inspection light;

a second light source that is arranged outside the cell and at a position different from the first light source in a rotation direction of the cell, and irradiates the measurement fluid with second inspection light;

a detector that is arranged outside the cell and detects transmitted light of the first inspection light transmitted through the measurement fluid and scattered light of the second inspection light scattered by the measurement fluid; and a cleaning mechanism that is arranged inside the cell and comes into contact with and clean an inner peripheral surface of the cell, wherein the cleaning mechanism includes a first cleaning mechanism arranged between the second light source and the detector.

* * * * *